(12) United States Patent
Shankar et al.

(10) Patent No.: US 12,386,721 B2
(45) Date of Patent: Aug. 12, 2025

(54) ANOMALY DETECTION USING USER BEHAVIORAL BIOMETRICS PROFILING METHOD AND APPARATUS

(71) Applicant: VERIZON PATENT AND LICENSING INC., Basking Ridge, NJ (US)

(72) Inventors: Bharatwaaj Shankar, Chennai (IN); Ishi Khamesra, Rajasthan (IN); Subham Biswas, Maharashtra (IN); Anne Lourdu Grace Joseph Martin, Chennai (IN); Malaya Rout, Tamil Nadu (IN); Venkadesh X. Thirupathi, Chennai (IN); Navin Dalavai Premkumar, Tamil Nadu (IN); Mohit Kumar, Kalyan Nagar Post (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 5 days.

(21) Appl. No.: 17/393,517

(22) Filed: Aug. 4, 2021

(65) Prior Publication Data
US 2023/0043793 A1  Feb. 9, 2023

(51) Int. Cl.
*G06F 11/34* (2006.01)
*G06N 20/10* (2019.01)
*H04L 67/50* (2022.01)

(52) U.S. Cl.
CPC ...... *G06F 11/3438* (2013.01); *G06F 11/3466* (2013.01); *G06N 20/10* (2019.01); *H04L 67/535* (2022.05)

(58) Field of Classification Search
CPC ............ G06F 11/3438; G06F 11/3466; H04L 67/535; G06N 20/10
See application file for complete search history.

(56) References Cited

U.S. PATENT DOCUMENTS

| | | | |
|---|---|---|---|
| 10,635,519 B1 * | 4/2020 | Tang | G06F 11/3447 |
| 2014/0165140 A1 * | 6/2014 | Singla | H04L 43/067 726/1 |
| 2014/0279745 A1 * | 9/2014 | Esponda | G06N 5/043 706/12 |

(Continued)

OTHER PUBLICATIONS

J. P. Magalhães and L. M. Silva, "Anomaly Detection Techniques for Web-Based Applications: An Experimental Study," 2012 IEEE 11th International Symposium on Network Computing and Applications, Cambridge, MA, USA, 2012, pp. 181-190, doi: 10.1109/NCA.2012.27. (Year: 2012).*

(Continued)

*Primary Examiner* — Jason D Recek

(57) ABSTRACT

Techniques for determining anomalous user behavior in connection with an online application are disclosed. In one embodiment, a method is disclosed comprising obtaining user behavior data in connection with a user of an application, generating feature data using the obtained user behavior data, obtaining one or more user behavior anomaly predictions from one or more anomaly prediction models trained to output a user behavior anomaly prediction in response to the feature data. Each user behavior anomaly prediction indicates a probability that the user behavior is anomalous. A user behavior anomaly determination is made using the user behavior anomaly prediction(s).

20 Claims, 10 Drawing Sheets

(56) References Cited

U.S. PATENT DOCUMENTS

| | | | | |
|---|---|---|---|---|
| 2016/0092774 | A1* | 3/2016 | Wang | H04L 67/535 |
| | | | | 706/46 |
| 2018/0189610 | A1* | 7/2018 | Kandemir | G06V 10/774 |
| 2018/0288063 | A1* | 10/2018 | Koottayi | H04L 63/1416 |
| 2019/0340540 | A1* | 11/2019 | Xu | G06F 11/3495 |
| 2020/0028862 | A1* | 1/2020 | Lin | H04L 63/104 |
| 2020/0136923 | A1* | 4/2020 | Altshuler | H04W 4/08 |
| 2020/0145447 | A1* | 5/2020 | Coffey | H04L 63/1425 |
| 2020/0193288 | A1* | 6/2020 | Li | G06N 3/045 |
| 2021/0011829 | A1* | 1/2021 | Nair | G06F 11/3013 |
| 2021/0067533 | A1* | 3/2021 | Zhou | G06F 16/90344 |
| 2022/0278914 | A1* | 9/2022 | Du | G06K 9/6263 |

OTHER PUBLICATIONS

H. H. W. J. Bosman, G. Iacca, H. J. Wörtche and A. Liotta, "Online Fusion of Incremental Learning for Wireless Sensor Networks," 2014 IEEE International Conference on Data Mining Workshop, Shenzhen, China, 2014, pp. 525-532, doi: 10.1109/ICDMW.2014. 79. (Year: 2014).*

* cited by examiner

| SESSION ID | USER ID | PAGE ID | TIME TAKEN | CLICK COUNT | KEY PRESS QUEUE |
|---|---|---|---|---|---|
| S_ID1 | U_ID1 | 227 | 1 m 3 s | 63 | Ctrl S, 7, 4, S, T, R, E, E, T, ... |
| S_ID2 | U_ID2 | 216 | 0 m 43 s | 27 | Ctrl V, Pointer, Mouse Click, Ctrl V, ... |
| S_ID3 | U_ID3 | 423 | 0 m 15 s | 01 | Scroll, Pointer, ... |

400

402 404 406

| SESSION ID | USER ID | USER BEHAVIOR ANOMALY DETERMINATION |
|---|---|---|
| S_ID1 | U_ID1 | NO |
| S_ID2 | U_ID2 | YES |
| S_ID3 | U_ID3 | NO |

ANOMALY DETECTION USING USER BEHAVIORAL BIOMETRICS PROFILING METHOD AND APPARATUS

BACKGROUND INFORMATION

Fraudulent user activity represents significant issues to entities, including entities conducting business online, online retailers, ecommerce platform providers providing goods and services to online users, etc.

BRIEF DESCRIPTION OF THE DRAWINGS

FIG. 4 provides a user behavior data examples and corresponding user behavior anomaly determination examples in accordance with one or more embodiments of the present disclosure;

DETAILED DESCRIPTION OF EXAMPLE EMBODIMENTS

Figure 1:
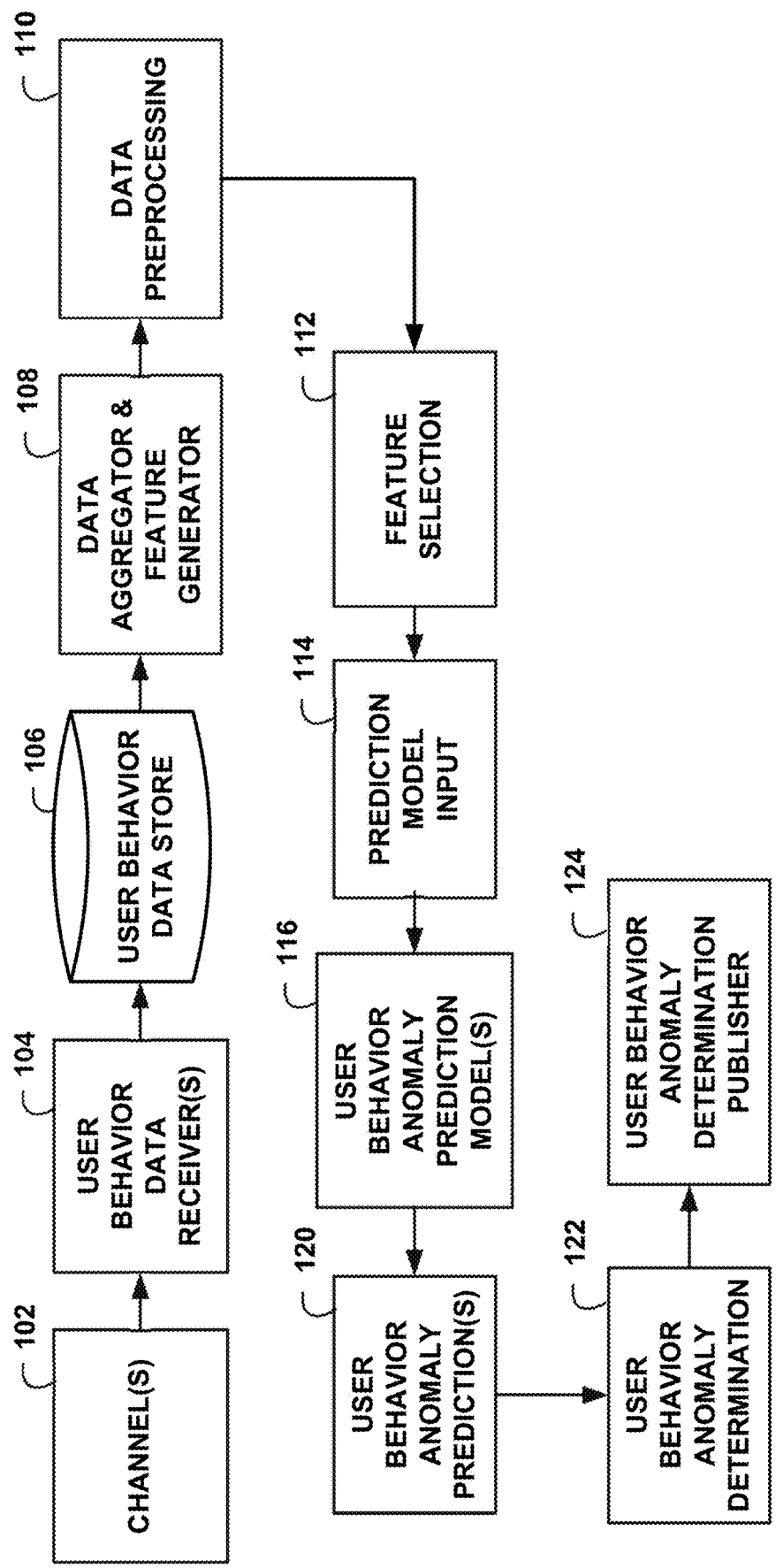
FIG. 1 provides an example illustrating anomalous user behavior prediction in accordance with one or more embodiments of the present disclosure.

The disclosed embodiments can be used in detecting anomalies in user behavior indicative of a bad actor with a fraudulent or other malevolent purpose. Some examples of fraudulent behavior include credit card fraud (e.g., using stolen credit card information to purchase goods and/or services), account takeover fraud (e.g., stealing an existing customer's login credentials to access the customer's online account), malicious bots (e.g., using automated tools to access existing customer accounts and/or create new accounts) and promotion fraud (e.g., reusing promotional codes, abusing coupon policies, etc.).

A bad actor operating online can be anonymous and can operate from virtually any location and at any time. As such, the bad actor can operate without being detected for some period of time, during which the bad actor can cause significant financial loss, computer security breaches, digital data breaches, user account breaches, malware installation, computing system and computer networking attacks, etc.

Embodiments of the present disclosure provide a mechanism for detecting and reporting anomalous behavior (e.g., of a bad actor) in an expedient manner. Embodiments of the present disclosure provide an effective mechanism for avoiding damage by the bad actors to their targets, such as and without limitation online providers (e.g., ecommerce providers), online users, computing systems and computing resources, electronic networks, etc.

An actor's behavior provides valuable insight into the intent or purpose of the actor, e.g., whether or not the actor is a bad actor. In accordance with embodiments of the present disclosure, a user's behavior can be evaluated to determine anomalous behavior, e.g., behavior that is inconsistent with a user's previous behavior, behavior that is inconsistent with other user's behavior, etc. By way of a non-limiting example, the user behavior can comprise behavior, or activity, associated with an online provider of goods and/or services.

In accordance with at least one disclosed embodiment, a user's behavior in connection with one or more channels (e.g., online, offline or some combination of online and offline channels), including an application, such as without limitation a web application, a mobile application, a chatbot or the like, can be evaluated and used in determining whether or not the user behavior is anomalous, inconsistent, user behavior. In accordance with one or more embodiments, one or more statistical models can be used to make an anomalous behavior prediction, which can be used to make an anomalous behavior determination. By way of a non-limiting example, an anomalous behavior determination can be used by a system (e.g., a risk mitigation system, such as and without limitation a fraud detection and prevention system of an online provider) to take action to mitigate risk.

A mechanism is provided for detecting anomalous user behavior using a user behavior anomaly prediction generated by an anomaly prediction model trained to output the prediction in response to feature data generated from user behavior data obtained in connection with one or more applications. Each user behavior anomaly prediction indicates a probability that a user's behavior is anomalous (e.g., different from the user's past behavior, different from other users' behavior, etc.). As a user is interacting with an application, user behavior data is collected and used to identify anomalous user behavior. Since anomalous user behavior can be detected as a user is interacting with an application, action can be taken in a timely manner to minimize damage resulting from the anomalous user behavior.

FIG. 1 provides an example illustrating anomalous user behavior prediction and determination in accordance with one or more embodiments of the present disclosure. User behavior data can be received from a number of channels 102. By way of some non-limiting examples, a channel 102 can be an application executing on a client device (e.g., mobile, desktop, laptop, etc. device), an application accessible via an electronic network (e.g., an application executing on a remote device, such as a server or other computing device), or some combination thereof. By way of a further non-limiting example, the channel(s) 102 can be used by users of an online provider to access (e.g., purchase) goods and/or services of the online provider. Some non-limiting examples of user behavior include keyboard input, cursor activity, touch screen usage, mobile device sensor input, etc.

In accordance with one or more embodiments, user behavior data from the channel(s) 102 can be received by user behavior data receiver 104, which can be configured to receive and store user behavior data in the user behavior data store(s) 106. By way of a non-limiting examples, a user behavior data receiver 104 can be a component of a web application, an application executing on a client device or some combination thereof.

In accordance with one or more embodiments, user behavior data can be associated with a session. As used herein, a session can be a group of interactions with a user (e.g., via a channel 102) in a given time frame, where the time frame can be a defined amount of time (e.g., 30 minutes). In accordance with one or more embodiments, user behavior data received by the user behavior data receiver(s) 104 can be stored in the user behavior data store 106 and associated with (in the store 106) an identifier (e.g., session identifier) identifying the session from which the user behavior data is received. In accordance with one or more embodiments, user behavior data from the user behavior data store 106 can be input to data aggregator and feature generator 108.

Figure 2:
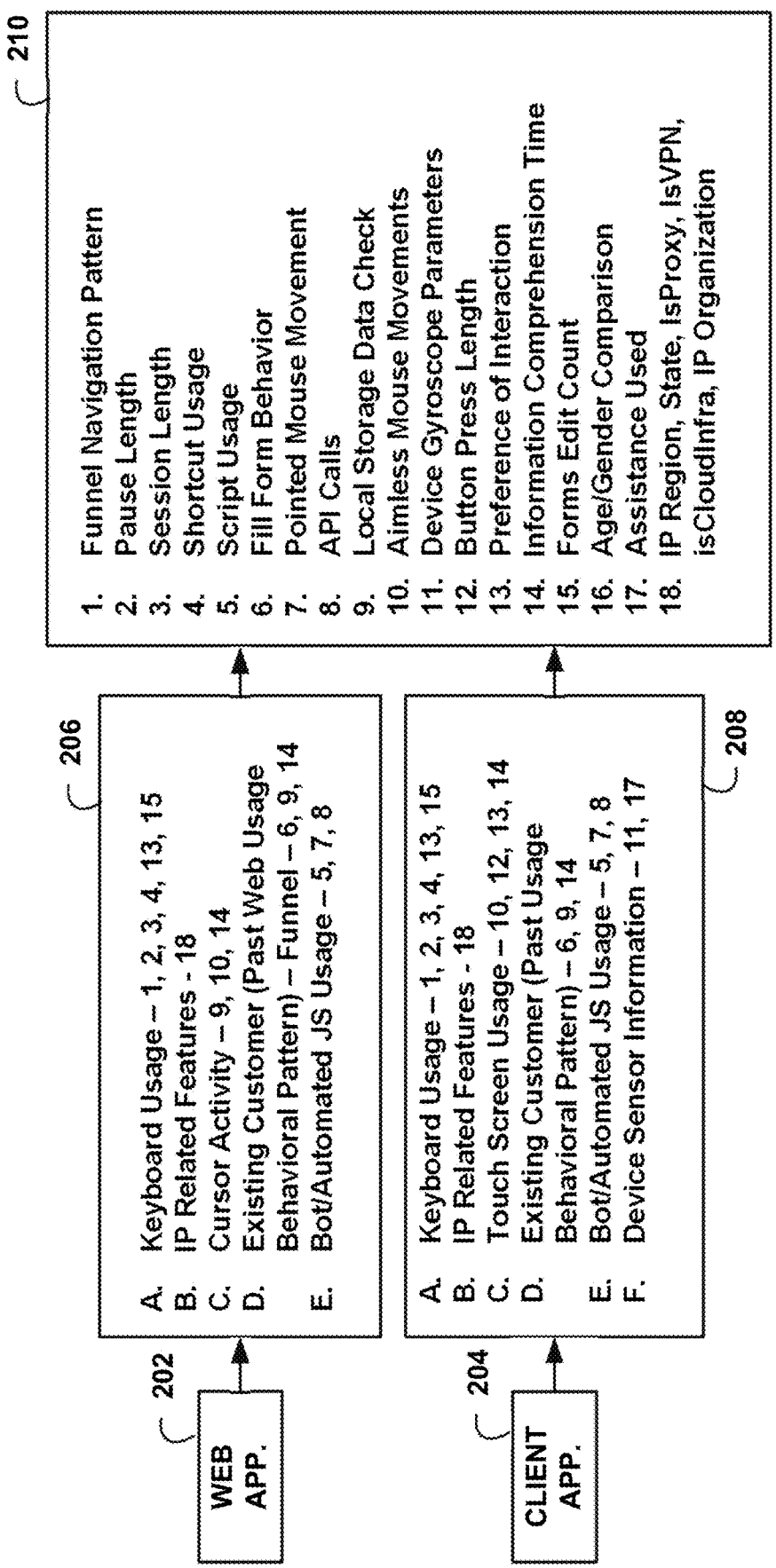
FIG. 2 provides examples of user behavior data in accordance with one or more embodiments.

FIG. 2 provides examples of user behavior data that can be stored in behavior data store 106 and can be input to data aggregator and feature generator 108 in accordance with one or more embodiments. In the example shown in FIG. 2, web application 202 and client application 204 can each be an example of a channel 102. Blocks 206 and 208 include examples of user behavior data that can be received (e.g., by user behavior data receiver(s) 104) from web application 202 and client application 204, respectively.

In the example shown in FIG. 2, blocks 206 and 208 include user behavior data items A, B, D and E. Keyboard usage under item A includes user behavior data, such as and without limitation, usage of left and/or right shift keys, keyboard shortcuts, functions keys, left and right control keys, keypad, etc. Keyboard usage can also include data about the extent to which a user uses cut and paste operations during a session. By way of a non-limiting example, cut and paste operations can signal that a user is copying information (e.g., someone else's information) into a form rather than providing the information from the user's own memory. Keyboard usage data can be compared with keyboard usage data from one or more previous sessions to determine whether keyboard usage is the same or different from the previous session(s).

Internet Protocol (IP) related features under item B includes IP-related data, such as and without limitation a network address of a client device being used by a user. A current session's IP-related data can be compared with IP-related data from one or more previous sessions to determine whether the current session's IP-related data matches the IP-related data from the previous session(s).

Existing Customer (Past Web Usage Behavioral Pattern—Funnel under item D includes previous behavioral pattern data (e.g., user behavior data associated with one or more previous sessions). Bot/Automated JavaScript (JS) usage under item E includes information identifying whether any scripts are used by the user. By way of a non-limiting example, user behavior data under item E can indicate use, by a user, of a script to automatically fill in input fields (e.g., using information from an application such as a word processing or spreadsheet application).

In the example shown in FIG. 2, block 206 also includes item C and block 208 includes items C and F. Cursor activity under item C of block 206 includes cursor movements (e.g., mouse, pointer, etc. input). This category of user behavior data can include data indicating mouse button usage and left and/or right hand input. Touch screen usage under item C of block 208 includes touch screen usage data, such as and without limitation use of an onscreen keyboard, left hand and/or right hand use, screen coordinates corresponding to onscreen button selections, etc.

Device sensor information under item F of block 208 can include device (e.g., mobile device) sensor information indicating how the user is holding the device, such as and without limitation at a certain horizontal and/or vertical angle, flat on a surface, landscape or portrait mode, etc. Item F user behavior information can further include information indicating whether the user is on the phone during the session. By way of a non-limiting example, the user might be on the phone with a customer service representative who is providing the user with assistance in filling out an online form.

In accordance with one or more embodiments, user behavior data from blocks 206 and 208 can be used by data aggregator and feature generator 108 to generate additional (e.g., aggregate) user behavior information (e.g., for a given session, or sessions), such as the examples provided at block 210 of FIG. 2.

In the example of FIG. 2, user behavior information under items 1-4, 13 and 15 of block 210 can be generated using user behavior information under item A of block 206 and/or block 208. Funnel navigation pattern under item 1 can include user behavior information such as navigation pattern information (e.g., a navigation path used by the user to arrive at a certain point, such as an application user interface screen or web page). By way of a further non-limiting example, a funnel navigation pattern can refer to a navigation path taken by a user to reach an intended outcome or action (e.g., making a purchase, signing up for a newsletter, playing content, etc.)

Pause length under item 2 can include user behavior information indicating a length of a pause by the user, e.g., an aggregate amount of time that the user took between actions. Session length under item 3 can include user behavior information indicating a length of a session, e.g., as an aggregate amount of time of a session. Shortcut usage under item 4 can include information indicating the shortcut(s) used by the user during the session. Preference of interaction under item 13 can include user behavior information indicating interaction preferences of the user. By way of a non-limiting example, user behavior information under item 13 can include information indicating which channel(s) 102 the user prefers using in connection with one or more activities (e.g., a user's preferred channel 102 for checking bills). Forms edit count under item 15 can include user behavior information indicating a number of forms edited by the user during a session, or sessions.

In the example of FIG. 2, script usage under item 5 of block 210 can be generated using user behavior information under item E of block 206 and/or block 208 and can include information indicating whether or not the user uses a script (e.g., JavaScript), or other programming, to fill in information (e.g., from another application such as a spreadsheet, word processing, or the like). Fill form behavior under item 6 of block 210 can be generated using user behavior information under item D of block 206 and/or block 208 and can include user behavior information indicating whether or not the user entered information (e.g., the user's name, address, etc.) from memory or with a pasting operation (e.g., copy and paste, cut and paste, etc.) when providing requested information.

Pointed mouse movement under item 7 of block 210 of the example can be generated using user behavior information under item E of block 206 and/or block 208 and can include user behavior information indicating whether or not or not mouse movements are automated (e.g., mouse movement using an emulator such as Selenium to emulate a user's interaction with a browser, application user interface, etc.). API calls under item 8 of block 210 can be generated using user behavior information under items C and D of block 206 and/or item D of block 208 and can include information indicating a number of application programming interface (API) calls. A higher than normal number of API calls can be an indicator of anomalous behavior.

Local storage data check under item 9 of block 210 can be generated using user behavior information under item E of block 206 and/or block 208 and can include user behavior information indicating whether or not a browser cookie or local data storage has been altered or enabled (or put) on the user's computing device without authorization and/or can indicate that browser cookie or local data storage contents cannot be authenticated. Aimless mouse movements under item 10 of block 210 can be generated using user behavior information under item C of block 206 and/or block 208 and can include information indicating whether or not mouse input of the user is aimless (e.g., not directed, not purposeful, etc.)

Device gyroscope parameters under item 11 of block 210 can be generated using device (e.g., mobile device, phone, etc.) sensor information under item F of block 208 and can include information indicating a rotation of the user's computing device. By way of non-limiting example, rotational information can be used with other item F user behavior information such as accelerometer information indicating an orientation of the user's computing device. Button press length under item 12 of block 210 can be generated using touch screen usage information under item C of block 208 and can include user behavior information indicating a length of time that the user maintained pressure on a button.

Preference of interaction information under item 13 of block 210 can be generated using user behavior information under items A and C of block 206 and/or block 208 and can include user behavior information indicating a user's interaction preferences. By way of a non-limiting example, a user's interaction preferences can indicate what application(s) the user prefers to use, such as which application the user typically uses to check the user's bills. Information comprehension time under item 14 of block 210 can be generated using user behavior information under item C of block 206 and/or block 208 and can include user behavior information indicating how much time a user uses to review displayed information, such as information displayed in a web page or an application user interface display.

Forms edit count under item 15 of block 210 can be generated using user behavior information under item A of block 206 and/or block 208 and can include user behavior information indicating the number of edits made by the user to a form, or forms. Assistance used under item 17 of block 210 can be generated using device sensor information under item F of block 208 and can include user behavior information indicating whether the user used assistance (e.g., telephone support) in filling a form or navigating a user interface. IP region, state, IsProxy, IsVPN, IsCloudInfra, IP organization under item 18 of block 210 can be generated using user behavior information under item B of block 206 and/or block 208 and/or item C of block 206 and can include information indicating an IP region, a state, information indicating whether or not any proxy is being used, information indicating whether or not the IP address being used is behind a virtual private network (VPN), server identity information (e.g., organization, region, state), etc.

Blocks 206, 208 and 210 are inexhaustive examples of user behavior information that can be used with one or more disclosed embodiments. Other information indicative of a user's behavior can also be used. In addition, and while many of the items in block 210 can be generated using information of the type associated with items in blocks 206 and 208, age/gender comparison information under items in block 210 can be generated from other sources. For example, user behavior information under item 16 of block 210 can come from user account information. User behavior information under item 16 can include information indicating a user's age and gender and comparisons with other ages and genders.

Referring again to FIG. 1, user behavior information, or data, such as that discussed in connection with FIG. 2 can be used to generate a user behavior feature data superset at data aggregator and feature generator block 108. At data preprocessing 110, the user behavior feature data superset can undergo various preprocessing steps, such as and without limitation, a variance check, correlation analysis and data normalization, prior to being input to feature selection 112. A variance check can provide a measure of the variability of the user behavior feature data. Correlation analysis can be used to identify correlations among the user behavior feature data. Normalization can be used to normalize the user behavior feature data. By way of a non-limiting example, normalization can be used to normalize the user behavior feature data to have the same standard deviation.

At feature selection 112, at least a portion of the user behavior feature data superset generated at block 108 and preprocessed at block 110 is selected to be used as the user behavior feature data that is used as prediction model input 114.

Block 110 can use principal component analysis (PCA) to select the user behavior feature data (e.g., from the user behavior feature data superset) to be used as prediction model input 114. Feature selection 112 using PCA can be used to select a set of features from the user behavior feature data superset that best represents the behavior of the user being analyzed. By way of some non-limiting examples, PCA can be used to select a set of features having a certain level of variability in accordance with the variance analysis and a certain level of correlations in the user behavior data determined using correlations analysis. The feature data in the set of selected features can be normalized using data normalization performed at data preprocessing block 110.

In the example shown in FIG. 1, in accordance with at least one embodiment, prediction model input 114 comprising the user behavior data selected at feature selection 112 becomes input to user behavior anomaly prediction model(s) 116. The user behavior anomaly prediction model(s) 116 uses the prediction model input 114 to generate one or more user behavior anomaly prediction(s) 120 in connection with a user and a session. By way of one non-limiting example, the user behavior anomaly prediction(s) 120 can comprise a number of predictions, each of which can comprise a probability, or likelihood, that the user behavior is anomalous.

At user behavior anomaly determination 122, the user behavior anomaly prediction(s) 120 can be used to make a determination whether or not the user's behavior is anomalous (different, inconsistent, irregular, etc.) as compared to the user's past behavior and/or the current and/or past behavior of other users. In accordance with one or more embodiments, the user behavior anomaly determination 122 can be published by user behavior anomaly determination publisher 124. By way of one non-limiting example, the publisher 124 can alert a system (e.g., a risk mitigation system of an online provider) by communicating information identifying a user and session and an indicator that the user's behavior is anomalous or not anomalous. By way of another non-limiting example, the publisher 124 can comprise a data store (e.g., database or other data store) and an application programming interface (API), which can be used by a system to retrieve a user behavior anomaly determination 122 for a user, or users.

By way of a non-limiting example, the channel(s) 102 can be provided by an e-commerce provider providing goods and/or services to users, the user behavior anomaly determination 122 can be used by a computing system (e.g., a risk mitigation system, such as fraud detection and prevention system) to identify potential undesirable activity by users or entities impersonating users—e.g., a bad actor.

Figure 3:
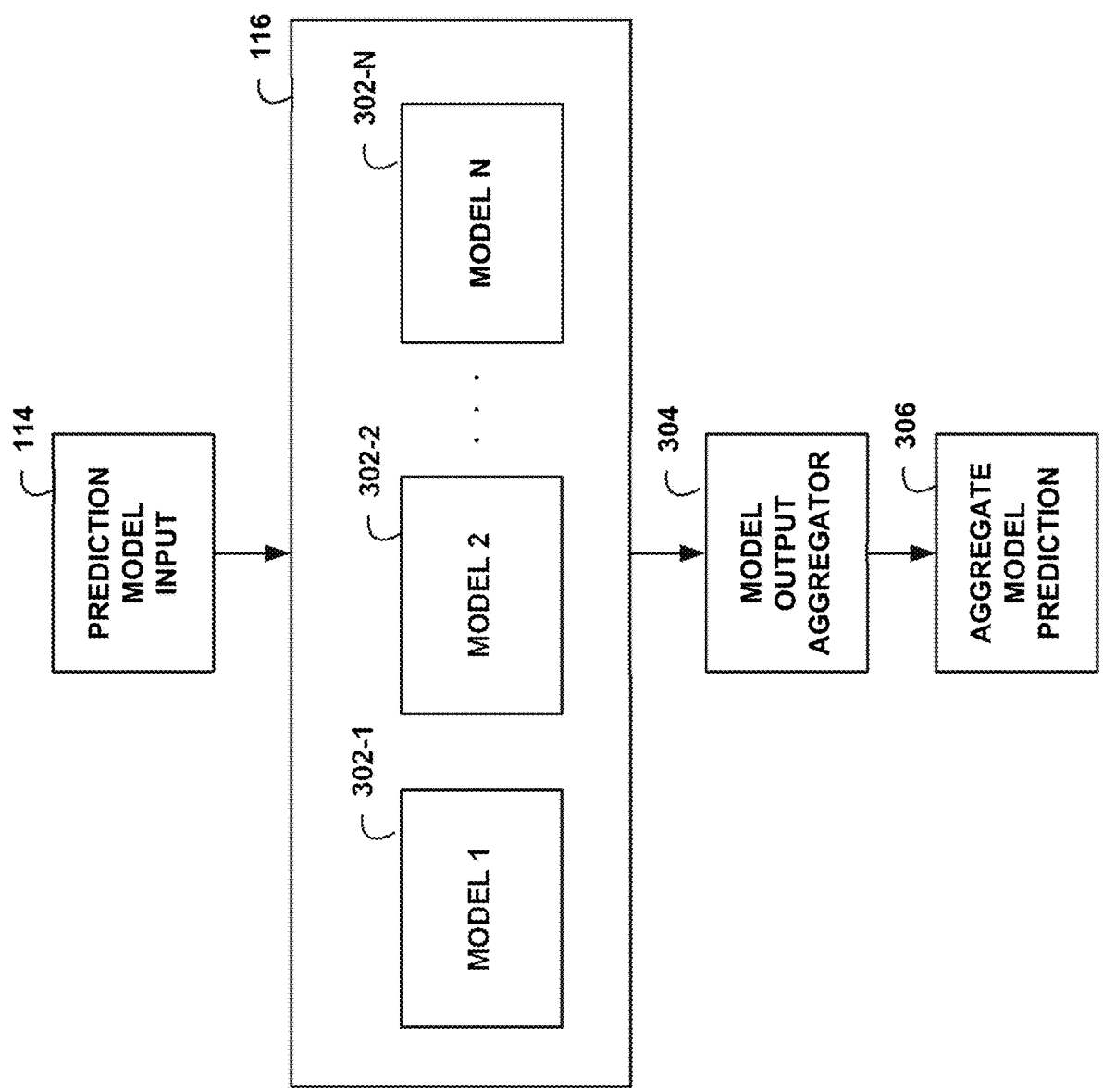
FIG. 3 provides an illustrative model prediction generation example using multiple prediction models in accordance with one or more embodiments of the present disclosure.

In accordance with one or more embodiments, user behavior anomaly prediction model(s) 116 can comprise a number of different prediction models. FIG. 3 provides an illustrative model prediction generation example using multiple prediction models in accordance with one or more embodiments of the present disclosure.

In accordance with one or more embodiments, user behavior anomaly prediction model(s) 116 can comprise more than one model, which is shown as models 302-1, 302-2, . . . , 302-N in the example of FIG. 3. For ease with referencing, models 302-1, 302-2, . . . , 302-N are also collectively referred to herein as models 302. As illustrated in the example, prediction model input 114 can be input to each of the models 302. Each of the models 302 can generate a user behavior anomaly prediction 120, which becomes input to model output aggregator 304. Model output aggregator 304 receives the user behavior anomaly prediction 120 from each of the models 302 and generates an aggregate model prediction 306. Aggregate model prediction 306 can be used to make a user behavior anomaly determination 122.

In accordance with one or more embodiments, models 302 can comprise an Isolation Forest machine learning algorithm, a variational auto-encoder and a one-class support vector machine (SVM). An isolation forest algorithm is an unsupervised machine learning algorithm that can be used to isolate anomalies (or outliers) in the prediction model input 114 feature data by recursively generating partitions on the prediction model input 114 comprising the user behavior feature set. Isolation forest can isolate outliers by randomly selecting a feature from the prediction model input 114 and then randomly selecting a split value between maximum and minimum values of the selected feature. The random partitioning of features can be used to distinguish between anomalous user behavior feature data values and normal user behavior feature data values. The isolation forest machine learned model can provide a probability score indicating a likelihood that the user behavior represented by the prediction model input 114 is anomalous user behavior.

Another example of a model that can be included in the models 302 is a variational auto-encoder (VAE), which is a deep learning technique. A VAE is a generative model and is a type of autoencoder which generates encoded data by encoding input data (e.g., prediction model input 114), decodes the encoded data and determines differences between the input data and the decoded data. Unlike other autoencoders, a VAE's encoder encodes the input data into a latent space, and its decoder decodes data points randomly sampled from the latent space to generate the decoded data that is used to determine whether or not the VAE was able to replicate the input data. An inability of the VAE to replicate the input data (e.g., the input data is not replicated by the encoding and decoding done by the VAE) indicates an anomaly. The VAE can provide a probability of the likelihood that the user behavior represented by the prediction model input 114 is anomalous user behavior.

A one-class SVM is another example of a model that can be included in the models 302. One-class SVM is an unsupervised learning algorithm. A one-class SVM model can be trained to identify anomalous user behavior by clustering the prediction model input 114 and then concentrating on any of the prediction model input 114 data identified as outliers to determine whether or not prediction model input 114 represents anomalous user behavior. The one-class SVM can provide a probability score indicating a likelihood that the user behavior represented by the prediction model input 114 includes at least one anomalous user behavior.

By way of a non-limiting example, the probability output from a model 302 can be a value in the range of 0-1, with 0 indicating the least likelihood of anomalous user behavior and 1 indicating the highest likelihood of anomalous user behavior.

The probability scores received from each of the models 302 can be aggregated by model output aggregator 304. By way of a non-limiting example, the model output aggregator 304 can average the output received from the models 302 to generate the aggregate model prediction 306. Any type of aggregation of the output of the models 302 can be used in connection with disclosed embodiments.

In aggregating the probabilities received from the models 302, the model output aggregator 304 can treat the output of each of the models 302 equally or use a weighting that results in the model output with a greater weighting having more influence in determining the aggregate model prediction 306. For example, a 25% (or 0.25) weighting might be associated with two of the models 302 and a 50% (or 0.5) weighting might be associated with a third model 302. In this case, the probability output by the third model 302 would have a greater influence on the aggregate model prediction 306 than the probability output by either of the other two models 302. In the example, the third model has as much influence on the aggregate model prediction 306 as the other two models combined.

To generate a weighted probability for a model 302, model output aggregator 304 can multiply the probability output by the model 302 by the weight associated with the model 302. The model output aggregator 304 can then aggregate (e.g., average) the weighted probabilities of each model 302 to generate the aggregate model prediction 306.

In accordance with one or more embodiments, user behavior data store 106 (of FIG. 1) can store real time user behavior data that can be used to determine whether anomalous user behavior exists in connection with an active session. User behavior anomaly determination publisher 124 can communicate a determination made in connection with an active session to risk mitigation system (e.g., a fraud detection and prevention system) so that the system can address the anomalous user behavior.

FIG. 4 provides a user behavior data examples and corresponding user behavior anomaly determination examples in accordance with one or more embodiments of the present disclosure. In the example shown in FIG. 4, table 400 includes examples of user behavior information, or data, that can be received by user behavior data receiver(s) 104 from channel(s) 102. Table 400 can be stored in user behavior data store 106. A session and user combination can have considerably more user behavior data than that shown in table 400. The user behavior data shown in table 400 (e.g., page ID, time taken, click count, key press queue) is provided for illustrative purposes only.

Table 420 can be stored in a data store, as is discussed in more detail in connection with FIG. 5. Table 420 provides an example of user behavior anomaly determinations 122 that can be made using the user behavior data in Table 400. In the example shown in FIG. 4, although each user and session combination has one associated user behavior anomaly determination 122, each user and session combination can have multiple user behavior anomaly determinations 122, each of which can have a corresponding timestamp indicating the point in the session at which the determination is made. By way of a non-limiting example, the multiple determinations 122 can be used to establish a user behavior anomaly determination pattern, which can be used (e.g., by a risk mitigation system) to determine whether or not to take some type of action, e.g., one or more actions to mitigate the risk.

Referring to Table 400, each of rows 402, 404 and 406 is associated with a session and user. Each session and each user is identified by a unique identifier. In the example of FIG. 4, a current user interface display is identified by a page identifier, or page ID. Although not shown in the example of FIG. 4, table 400 can include an identifier of each page visited by a user in a current session, or sessions. By way of a non-limiting example, the page ID of each page visited by a user in a session can be used in determining a navigation pattern (e.g., user behavior information under item 1 of block 210 of FIG. 2).

In the example shown in FIG. 4, each row 402, 404 and 406 includes a time taken column, which can include information indicating the amount of time taken on the current page identified by the page ID (e.g., user behavior information under item 2 of block 210 of FIG. 2). Although not shown in the example, a time taken can be associated with each page ID of each page visited by a user in a current session, and an aggregate of the times that the user has taken at each page in a session can be used to determine a session time (e.g., user behavior information under item 3 of block 210 of FIG. 2).

Each of rows 402, 404 and 406 of table 400 includes a count of the number of clicks (e.g., mouse clicks) by the user in the current session. A click count is a type of cursor activity (e.g., user behavior information under item C of block 206 or block 208 of FIG. 2). By way of a non-limiting example, click count can be used in determining user behavior information under items 9, 10, 12, 13 and/or 14 of block 210 of FIG. 2.

In the example shown in FIG. 4, table 400 includes a key press queue, which can be processed to generate the user behavior information under items in blocks 206, 208 and 210 of FIG. 2.

Table 420 includes a user behavior anomaly determination 122 for each user and session combination shown in table 400. In accordance with embodiments of the present disclosure, a user behavior anomaly determination 122 can be triggered in various ways, such as and without limitation triggered based on an interval of time (e.g., an increment of time in a session, since the last determination, etc.), triggered based on the amount of user behavior data received, etc. In accordance with one or more embodiments, at the start of a session, a default can be used that indicates that the user behavior is not anomalous prior to an initial user behavior anomaly determination 122 being triggered. In accordance with one or more embodiments, an initial user behavior anomaly determination 122 may be made sooner relative to subsequent user behavior anomaly determinations 122 made in the session.

In the example shown in row 406 of table 400, assuming that the current page is the first page in the session, the session has just begun and there is minimal information collected in connection with the session at this point. In such a case, the associated user behavior anomaly determination 122 in row 426 corresponding to row 406 (of table 400) can have a default, initial value of "No."

As shown in the example of FIG. 4, each session ID and user ID combination can have an associated user behavior anomaly determination 122 indicating whether or not anomalous user behavior has been detected in connection with the user and session combination. In the example shown in table 420, row 424 indicates that anomalous user behavior has been detected in connection with the session and user. By way of a non-limiting example, using the user behavior example of table 400, the determination might be made based on the lengthy time taken, and the user's information pasting (i.e., Ctrl V) behavior.

In the example shown in FIG. 4, the session and user associated with row 422 indicates that there is no anomalous user behavior detected in the user behavior (e.g., user behavior indicated in row 402 of table 400).

In accordance with one or more embodiments, a user behavior anomaly determination 122 corresponding to a user and session can be stored for access by a risk mitigation system. FIG. 5 provides an exemplary illustration of a user behavior anomaly determination publication in accordance with one or more embodiments of the present disclosure.

Figure 5:
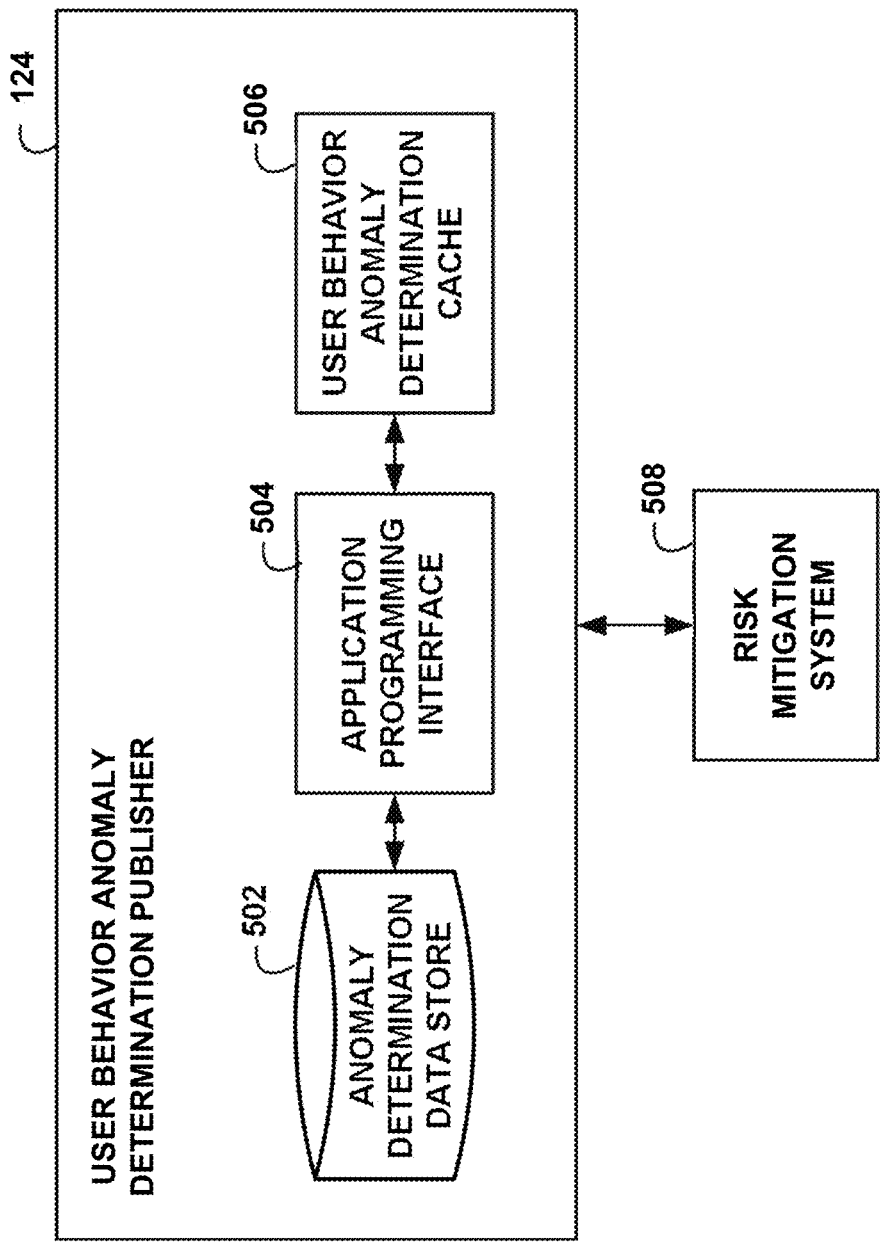
FIG. 5 provides an exemplary illustration of a user behavior anomaly determination publication in accordance with one or more embodiments of the present disclosure.

In the example shown in FIG. 5, user behavior anomaly determination publisher 124 comprises an anomaly determination data store 502, an application programming interface (API) 504 and user behavior anomaly determination cache 506. In accordance with one or more embodiments, anomaly determination data store 502 can be a database management system's database comprising a number of tables. The database can include one or more tables associating user information (e.g., name, address, age, gender, other demographic information, etc.), session information (date and time commenced, data and time ended, network information, such as network address, user interface navigation path, user input, etc.) and one or more user behavior anomaly determinations 122 determined for the user and session combination. In accordance with one or more embodiments, each user behavior anomaly determination 122 can be associated with a timestamp (e.g., a data and time) indicating a timing of the determination, a user (e.g., a user identifier, or userID) and session (e.g., a session identifier, or sessionID).

As shown in the example, a risk mitigation system 508 can communicate with the user behavior anomaly determination publisher 124 and access user behavior anomaly determinations 122 stored in anomaly determination data store 502. In accordance with one or more embodiments, API 504 can be used by risk mitigation system 508 to access user behavior anomaly determinations 122 stored in anomaly determination data store 502.

In addition to anomaly determination data store 502, the example of FIG. 5 includes a user behavior anomaly determination cache 506, which can store some of the user behavior anomaly determinations 122 stored in the anomaly determination data store 502. By way of a non-limiting example, user behavior anomaly determination cache 506 might store one or more weeks of the most recent user behavior anomaly determinations 122 for a number of user and session combinations.

By way of a non-limiting example, the user behavior anomaly determination publisher 124 can receive a user behavior anomaly determination access request (e.g., a query) from the risk mitigation system 508 via the API 504. The user behavior anomaly determination request might identify one or more user and session combinations and a time period. In response to a user behavior anomaly determination request, the user behavior anomaly determination publisher 124 can retrieve the requested user behavior anomaly determination(s) 122 and store them in the user behavior anomaly determination cache 506 for access by the risk mitigation system 508 (e.g., via the API 504).

In accordance with one or more embodiments, the user behavior anomaly determination publisher 124 can be hosted by a cloud computing platform provider (e.g., Amazon Web Services, etc.) Alternatively, the user behavior anomaly determination publisher 124 can be hosted by a server computing device. As yet another alternative, the user behavior anomaly determination publisher 124 can be hosted by some combination of a cloud computing platform provider and a server computing device. As yet another alternative, the user behavior anomaly determination publisher 124 can be hosted by one or more computing devices configured to execute one or more of blocks 104, 108, 110, 112, 116 and 122.

Figure 6:
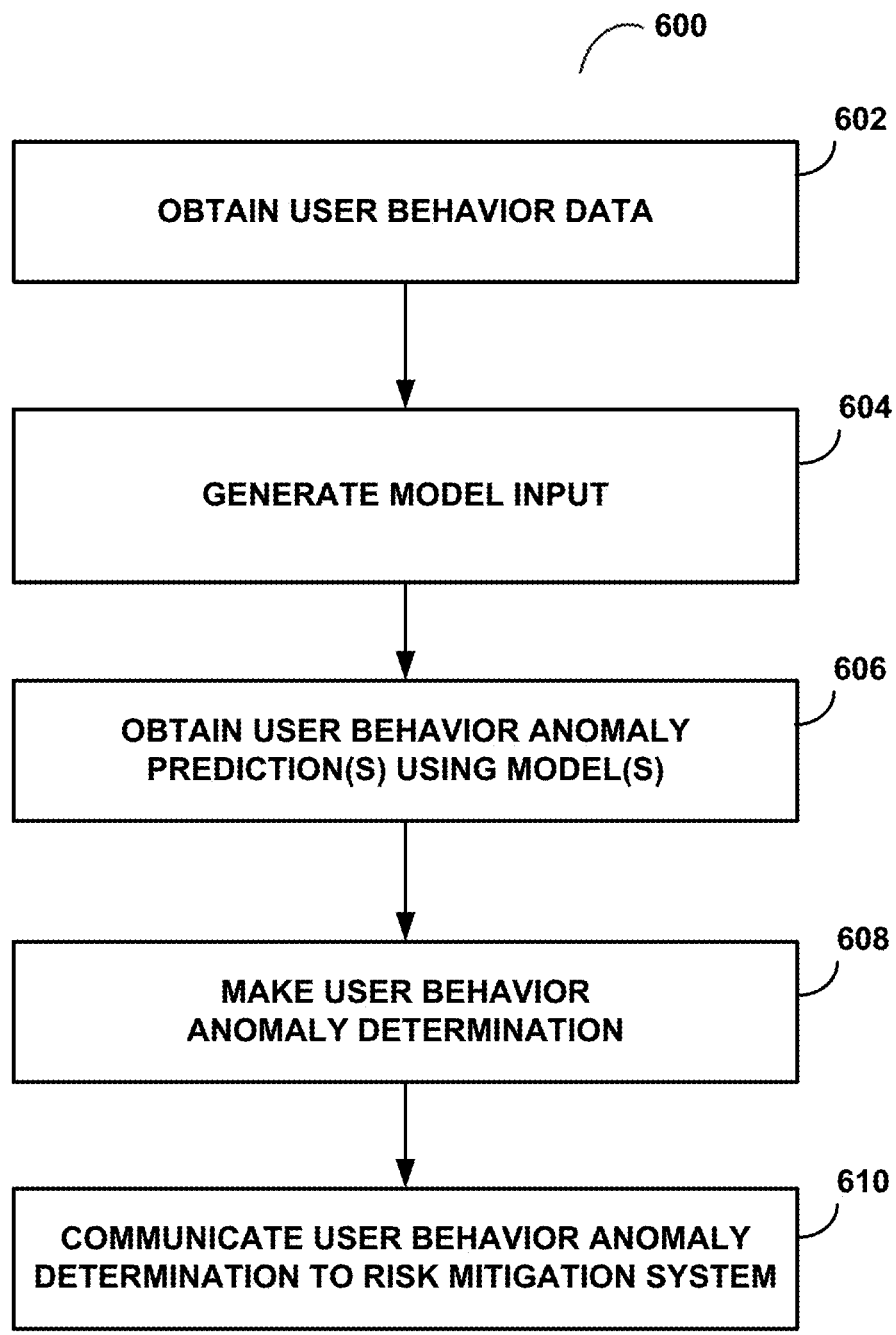
FIG. 6 provides an example of a user behavior anomaly process flow in accordance with one or more embodiments of the present disclosure.

FIG. 6 provides an example of a user behavior anomaly process flow in accordance with one or more embodiments of the present disclosure. Briefly, steps included in process flow 600 can be performed in connection with user behavior and interaction with an online or offline channel (e.g., an online or offline application, chatbot, mobile application, etc.). It should be apparent that any channel (online or offline) can be used in connection with the embodiments disclosed herein. In accordance with one or more embodiments, process flow 600 can operate to make a user behavior anomaly determination using one or more user behavior anomaly predictions and communicate the determination to another system, such as a risk mitigation system, which can determine what if any action to take in connection with the user behavior anomaly determination.

At step 602, user behavior information, or data, is obtained. By way of a non-limiting example, the user behavior data that is collected can correspond to a particular user and session. By way of a further non-limiting example, the session can be a session with an online ecommerce provider (e.g., a provider of goods, services or some combination) associated with a risk mitigation system. By way of a non-limiting example, the user behavior data can be obtained via a channel 102 and user behavior data receiver 104. By way of a further non-limiting example, the user behavior data can be retrieved from a user behavior data store 106.

In accordance with one or more embodiments, the user behavior data that is obtained at step 602 can be in connection with any user behavior involving a user's interaction with a channel 102 being used or accessed by the user.

As discussed herein (e.g., in connection with FIGS. 2 and 4), the user behavior data obtained in connection with a user and session can comprise a number of different types of data, as discussed in connection with FIG. 2, such as and without limitation keyboard usage, touch screen usage, historical user behavior data, network address and device sensor data. In addition, and as discussed herein, the user behavior can include aggregate data, such as that discussed in connection with block 210 of FIG. 2.

At step 604, model input can be generated. As discussed in connection with FIG. 1, data aggregator and feature generator 108 can use user behavior data from user behavior data store 106 to generate user behavior feature data using user behavior data and/or aggregate user behavior data (e.g., such as the data shown in blocks 206, 208 and 210 of FIG. 2). Step 604 can include one or more data preprocessing operations, such as and without limitation a variance check, correlation analysis and data normalization. As discussed herein in connection with FIG. 1, data preprocessing can be performed by data processing module 110 of FIG. 1.

In accordance with one or more embodiments, the model input generation (at step 604) can include feature selections to select at least a portion of the user behavior feature data to be used as the model input. By way of a non-limiting example, PCA can be used to select from a user behavior feature data superset a set of features that best represents the behavior of the user whose behavior is being analyzed to identify any anomalous behavior. In accordance with one or more embodiments, feature selection can be used to select a set of features having a certain level of variability in accordance with the variance analysis and a certain level of correlations in the user behavior data determined using correlations analysis. The feature data in the set of selected features can be normalized using data normalization. As discussed herein, variance analysis, correlation analysis and data normalization can be performed at data preprocessing 110.

At step 606, one or more user behavior anomaly prediction(s) 120 are obtained. In accordance with one or more embodiments, the model input generated at step 604 can be input to one or more user behavior anomaly prediction models, such as models 302. As discussed in connection with FIG. 3, models 302 can comprise an Isolation Forest model, a VAE model and a one-class SVM model.

As discussed herein, an isolation forest model can be trained to isolate outlying feature data from the model input by randomly selecting a feature from the model input and then randomly selecting a split value between maximum and minimum values of the selected feature. The random partitioning of features can be used to distinguish between anomalous data values and normal data values. A VAE model can be trained to identify anomalous user behavior by attempting to replicate the model input using an encoder to encode some or all of the model input data, using a decoder to decode the encoded data and then comparing the original model input data with the decoded data to identify anomalies in the user behavior model input. An SVM model can be trained to identify anomalous user behavior by clustering the model input and then concentrating on any of the model input data identified as outliers to determine whether or not prediction model input represents anomalous user behavior.

In accordance with one or more embodiments, each of the models 302 used at step 606 can provide a probability score indicating a likelihood that the user behavior represented by the prediction model input 114 (or user behavior feature data input to model(s) 116) is anomalous user behavior.

At step 608, a user behavior anomaly determination 122 is made. In accordance with one or more embodiments, step 608 can include a step of aggregating multiple user behavior anomaly predictions to yield one probability score in the case that multiple user behavior anomaly predictions are obtained at step 606. In any case, the user behavior anomaly prediction(s) obtained at step 606 is/are used to make the user behavior anomaly determination 122 at step 608.

In accordance with one or more embodiments, the user behavior anomaly determination 122 can be made using a probability score (e.g., a probability score output by a single model or an aggregate probability score(s) output by more than one model) and a threshold probability value. The threshold probability can be empirically determined based on the number of true and false positives.

By way of a non-limiting example, assuming that a higher probability score is more indicative of anomalous user behavior than a lower probability score, the probability threshold can be set such that a probability score that is equal to or greater than threshold probability is indicative of anomalous user behavior. As yet another example, a lower probability score can be more indicative of anomalous user behavior, the probability threshold can be set such that a probability score that is equal to or less than threshold probability is indicative of anomalous user behavior. Generally, the user behavior anomaly determination can be made based on whether or not the probability satisfies the threshold.

At step 610, the user behavior anomaly determination can be communicated to a computing system, such as a risk mitigation system. By way of a non-limiting example, the user behavior anomaly determination can be communicated to an ecommerce platform provider, an entity conducting business online, etc. that is providing channels 102 offering goods and/or services to online customers. The user behavior anomaly determination(s) communicated at step 610 can be used to identify a bad actor such that the risk can be mitigated.

In accordance with one or more embodiments, a user behavior anomaly determination communicated (at step 610) to a system (e.g., a risk mitigation system 508) can result in the system monitoring a user session, terminating the session, flagging the session, raising an alert, etc.

Figure 7:
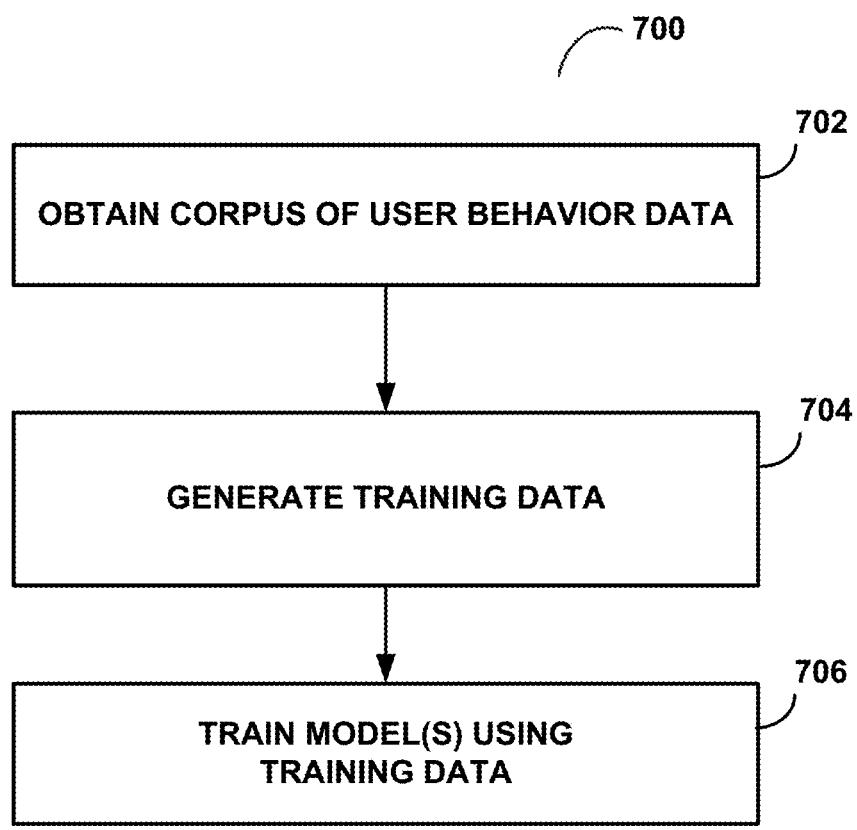
FIG. 7 provides an example of a model training process flow used in accordance with one or more embodiments of the present disclosure.

As discussed herein in connection with one or more embodiments, one or more user behavior anomaly prediction models (e.g., models 302) can be trained to predict anomalous user behavior. FIG. 7 provides an example of a model training process flow used in accordance with one or more embodiments of the present disclosure. In general, steps included in process flow 700 can be performed using user behavior data obtained in connection with a number of sessions and users accessing one or more channels (online and/or offline channels) provided by one or more providers. In accordance with one or more embodiments, process flow 700 can operate to use the user behavior data to generate a number of training examples that can be used to train each user behavior anomaly prediction model using one or more machine learning algorithms.

At step 702, a corpus of user behavior data can be obtained (e.g., from user behavior data store 106). In accordance with one or more embodiments, the corpus of user behavior data can be associated with multiple users and sessions. By way of a non-limiting example, user behavior data obtained at step 702 in connection with multiple sessions and multiple users of one or more channels can be stored (or logged) and used as the corpus of activity data.

At step 704, training data is generated. In accordance with one or more embodiments, the training data comprising a number of feature datasets can be generated using some or all of the user behavior data obtained at step 702.

At step 706, one or more models are trained using the training data. By way of a non-limiting example, training data comprising a number of feature datasets generated (at step 704) using some or all of the corpus of user behavior data (obtained at step 702) can be used to train the models 302. In accordance with one or more embodiments, the training data can comprise multiple training examples (e.g., multiple feature datasets) that can be used to train each of the user behavior anomaly prediction models 302 to make a user behavior anomaly prediction 120 in response to feature dataset input generated using user behavior data associated with a user and a current session with a channel 102. As discussed, each model (e.g., each of the models 302) can be trained to output a probability score indicating a likelihood that the user behavior represented by the prediction model input 114 is anomalous user behavior. In accordance with one or more embodiments, 706 can be used with one or more machine learning algorithms and training data generated (at step 704) using data obtained (at step 702) to train models 302.

In accordance with one or more embodiments, user behavior can be monitored to detect anomalous user behavior using one or more trained user behavior anomaly predictions models 302 and user behavior data, such as that discussed in connection with FIGS. 2 and 4. Unlike a brick-and-mortar establishment, an online provider (e.g., an ecommerce provide, online retailer, or any entity doing business and/or providing goods and/or services online) is unable to assess someone (e.g., a user, customer, etc.) in person, obtain someone's credentials for verification purposes, etc. Online fraud is increasing dramatically. Advantageously, embodiments of the present disclosure can be used to make user behavior anomaly determinations, and then communicate the user behavior anomaly determinations to a risk mitigation system which can take steps to mitigate the risk.

Figure 8:
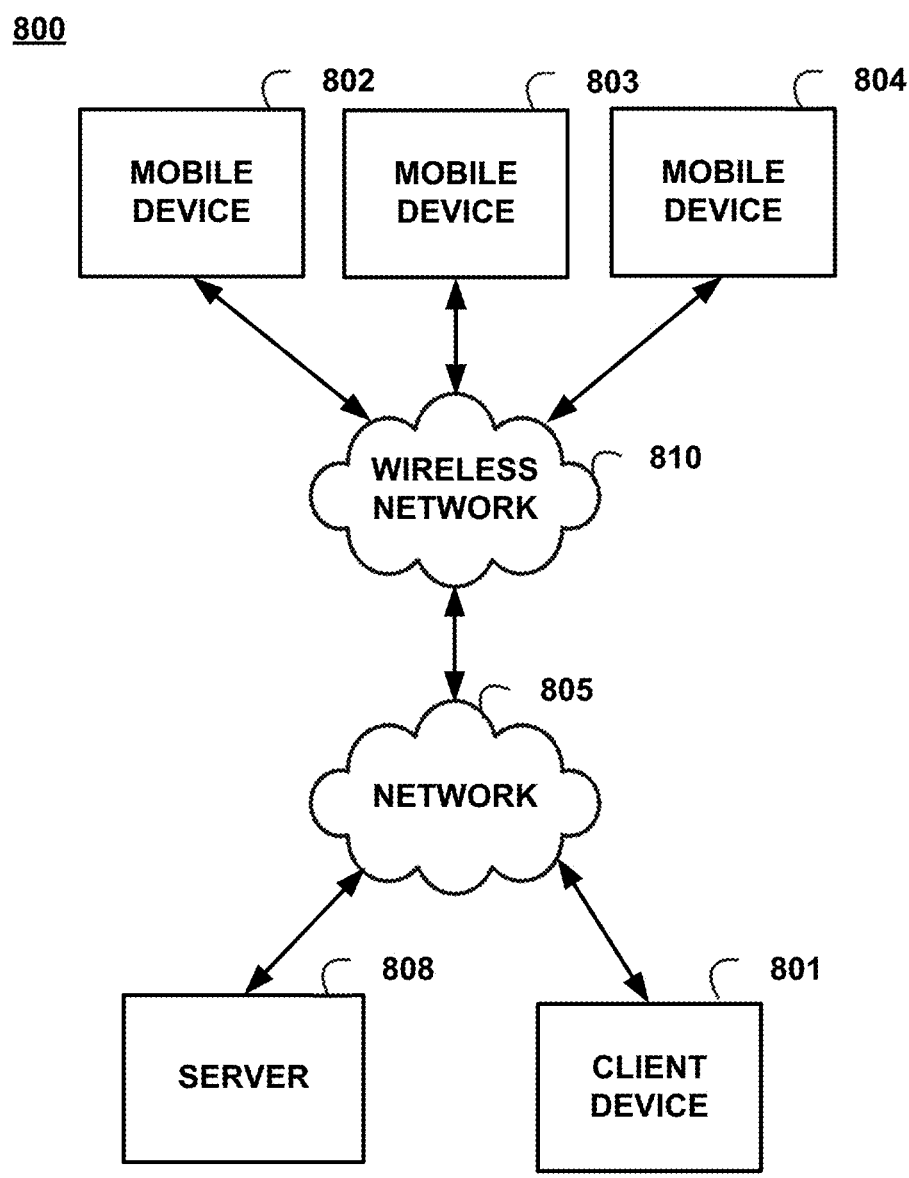
FIG. 8 is a schematic diagram illustrating an example of a network within which the systems and methods disclosed herein could be implemented according to some embodiments of the present disclosure.

FIG. 8 provides an example of components of a general environment in accordance with one or more embodiments. FIG. 8 shows components of a general environment in which the systems and methods discussed herein may be practiced. Not all the components may be required to practice the disclosure, and variations in the arrangement and type of the components may be made without departing from the spirit or scope of the disclosure. As shown, system 800 of FIG. 8 includes local area networks ("LANs")/wide area networks ("WANs")—network 805, wireless network 810, mobile devices (client devices) 802-804 and client device 801. FIG. 8 additionally includes a server 808. Examples of web servers include without limitation, application servers, content servers, search servers, advertising servers, etc.

In accordance with one or more embodiments, server 808 can include functionality disclosed herein in connection with one or more embodiments. Server 808 can host one or more web applications, for which user reaction is being monitored.

One embodiment of mobile devices 802-804 is described in more detail below. Generally, however, mobile devices 802-804 may include virtually any portable computing device capable of receiving and sending a message over a network, such as network 805, wireless network 810, or the like. Mobile devices 802-804 may also be described generally as client devices that are configured to be portable. Thus, mobile devices 802-804 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 802-804 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 802-804 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 802-804 may uniquely identify themselves through any of a variety of mechanisms, including a phone number, Mobile Identification Number (MIN), an electronic serial number (ESN), or other mobile device identifier.

In some embodiments, mobile devices 802-804 may also communicate with non-mobile client devices, such as client device 801, or the like. Client device 801 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 801 may also have differing capabilities for displaying navigable views of information.

Client device 801 and mobile devices 801-804 may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 810 is configured to couple mobile devices 802-804 and its components with network 805. Wireless network 810 may include any of a variety of wireless sub-networks that may further overlay stand-alone ad-hoc networks, and the like, to provide an infrastructure-oriented connection for mobile devices 802-804. Such sub-networks may include mesh networks, Wireless LAN (WLAN) networks, cellular networks, and the like.

Network 805 is configured to communicatively couple web server 808 with other computing devices, including, client device 801, and through wireless network 810 to mobile devices 802-804. Network 805 is enabled to employ any form of computer readable media for communicating information from one electronic device to another. Also, network 805 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

A server, such as server 808, may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers, such as web server 808 as well as other servers, such as and without limitation authentication servers, search servers, email servers, social networking services servers, SMS servers, IM servers, MMS servers, exchange servers, photo-sharing services servers, and travel services servers, via the network 805 using their various devices 801-804. In some embodiments, application server can host applications, such as an e-commerce application, a search engine, a content recommendation and/or distribution application, etc.

In some embodiments, web server 808 can store various types of applications and application related information including application data. As is discussed in more detail below, examples of application data include user behavior, application behavior, page visitation sequences, and visit intent and action data. In accordance with some embodiments, web server 808 can host an application, or applications, embodying functionality described herein.

Moreover, although FIG. 8 illustrates web server 808 as single computing devices, respectively, the disclosure is not so limited. For example, one or more functions of web server 808 may be distributed across one or more distinct computing devices. Moreover, in one embodiment, web server 808 may be integrated into a single computing device, without departing from the scope of the present disclosure.

Figure 9:
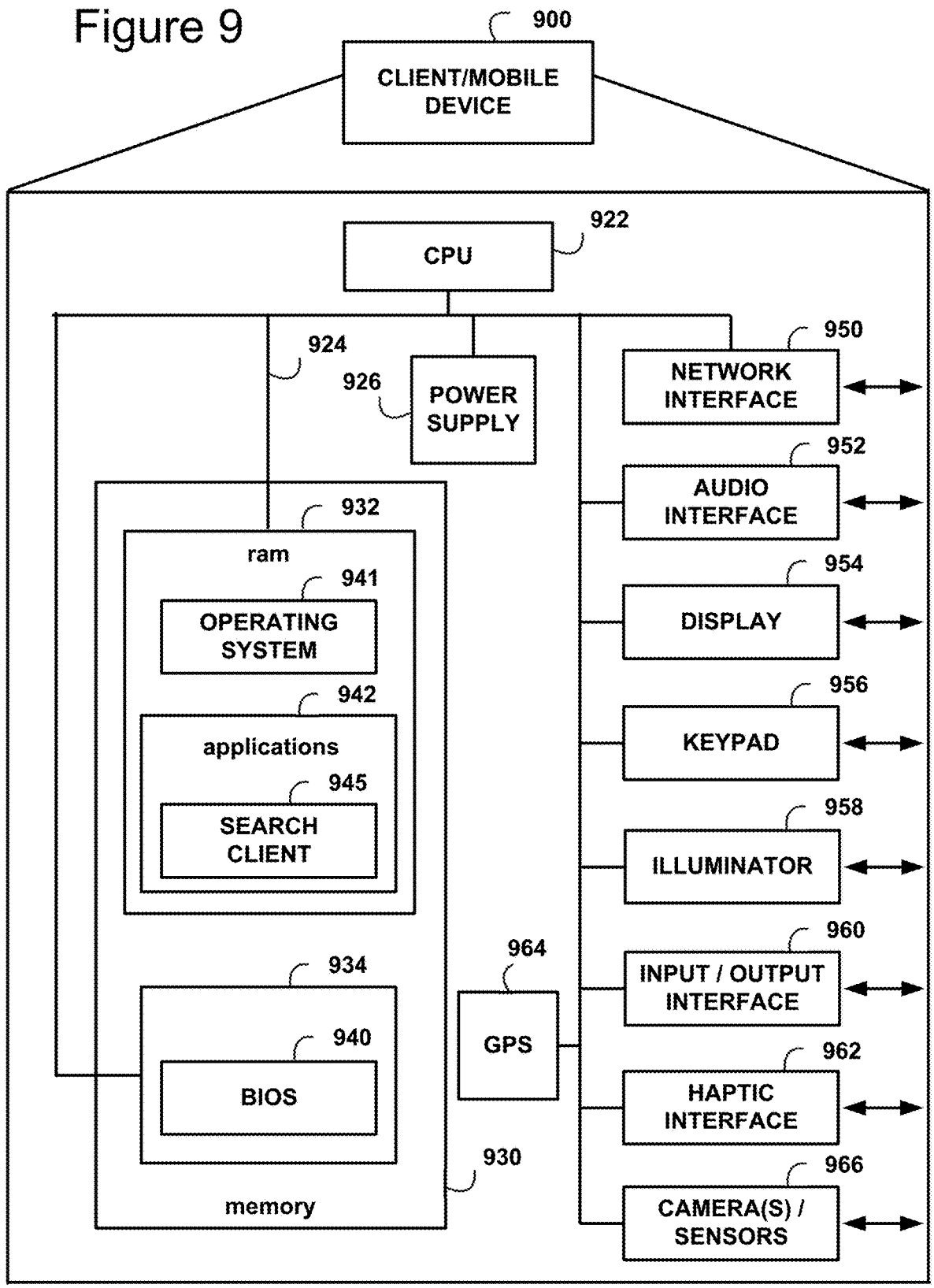
FIG. 9 depicts is a schematic diagram illustrating an example of client device in accordance with some embodiments of the present disclosure.

FIG. 9 is a schematic diagram illustrating an example embodiment of a computing device that may be used within the present disclosure. Device 900 may include many more or less components than those shown in FIG. 9. However, the components shown are sufficient to disclose an illustrative embodiment for implementing the present disclosure. Device 900 may represent, for example, client device 801 and mobile devices 801-804 discussed above in relation to FIG. 8.

As shown in the figure, device 900 includes a processing unit (CPU) 922 in communication with a mass memory 930 via a bus 924. Device 900 also includes a power supply 926, one or more network interfaces 950, an audio interface 952, a display 954, a keypad 956, an illuminator 958, an input/output interface 960, a haptic interface 962, an optional global positioning systems (GPS) receiver 964 and a camera(s) or other optical, thermal or electromagnetic sensors 966. Device 900 can include one camera/sensor 966, or a plurality of cameras/sensors 966, as understood by those of skill in the art. The positioning of the camera(s)/sensor(s) 966 on device 900 can change per device 900 model, per device 900 capabilities, and the like, or some combination thereof.

Device 900 may optionally communicate with a base station (not shown), or directly with another computing device. Network interface 950 includes circuitry for coupling device 900 to one or more networks, and is constructed for use with one or more communication protocols and technologies as discussed above.

Optional GPS transceiver 964 can determine the physical coordinates of device 900 on the surface of the Earth, which typically outputs a location as latitude and longitude values. GPS transceiver 964 can also employ other geo-positioning mechanisms, including, but not limited to, triangulation, assisted GPS (AGPS), E-OTD, CI, SAI, ETA, BSS or the like, to further determine the physical location of device 900 on the surface of the Earth. In an embodiment device 900 may through other components, provide other information that may be employed to determine a physical location of the device, including for example, a MAC address, Internet Protocol (IP) address, or the like.

Mass memory 930 includes a RAM 932, a ROM 934, and other storage means. Mass memory 930 illustrates another example of computer storage media for storage of information such as computer readable instructions, data structures, program modules or other data. Mass memory 930 stores a basic input/output system ("BIOS") 940 for controlling low-level operation of device 900. The mass memory also stores an operating system 941 for controlling the operation of device 900. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 930 further includes one or more data stores, which can be utilized by device 900 to store, among other things, applications 942 and/or other data. For example, data stores may be employed to store information that describes various capabilities of device 900. The information may then be provided to another device based on any of a variety of events, including being sent as part of a header during a communication, sent upon request, or the like. At least a portion of the capability information may also be stored on a disk drive or other storage medium (not shown) within device 900.

Applications 942 may include computer executable instructions which, when executed by device 900, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 942 may further include search client 945 that is configured to send, to receive, and/or to otherwise process a search query and/or search result using any known or to be known communication protocols. Although a single search client 945 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Figure 10:
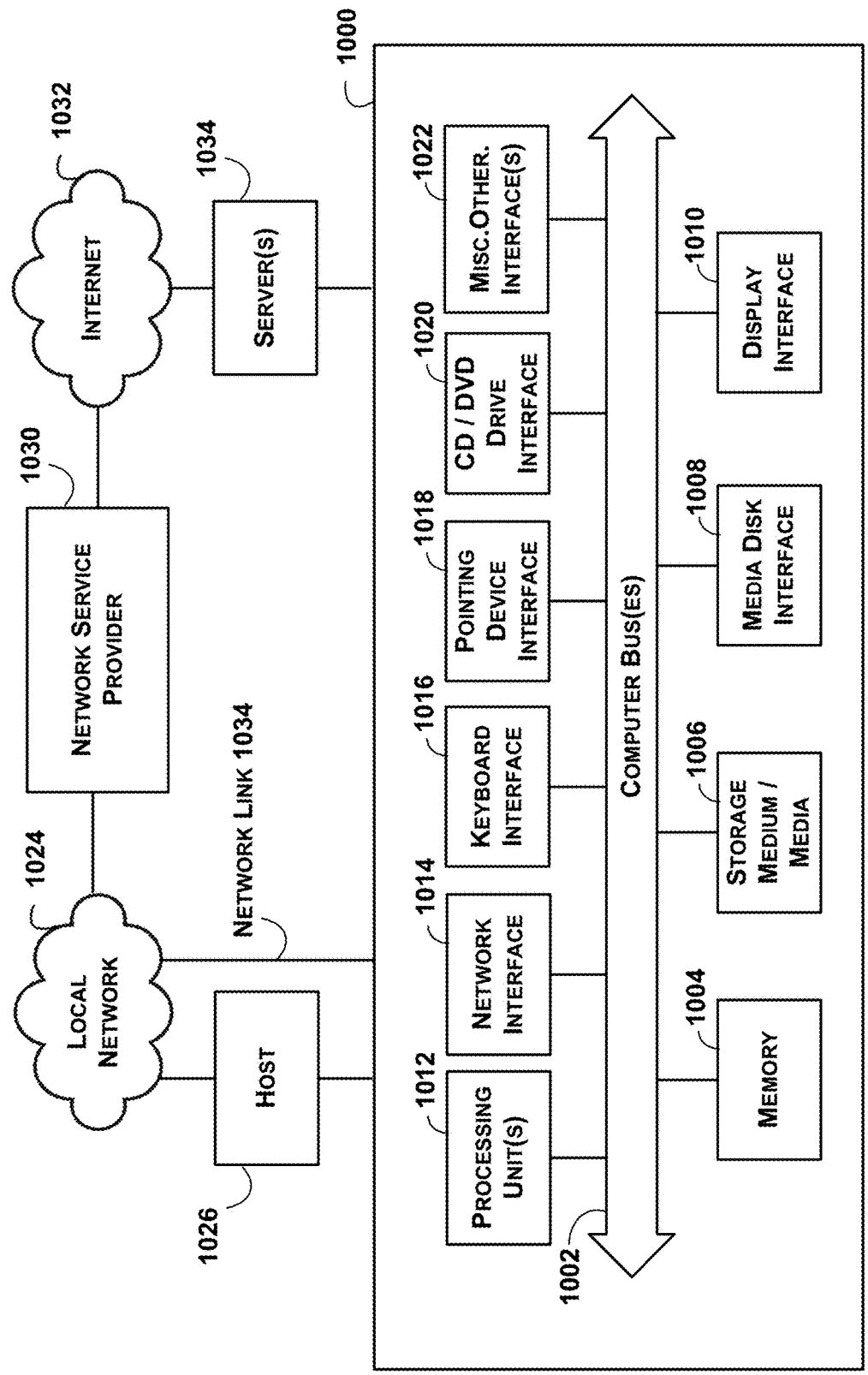
FIG. 10 is a block diagram illustrating the architecture of an exemplary hardware device in accordance with one or more embodiments of the present disclosure.

As shown in FIG. 10, internal architecture 1000 of a computing device(s), computing system, computing platform, user devices, set-top box, smart TV and the like includes one or more processing units, processors, or processing cores, (also referred to herein as CPUs) 1012, which interface with at least one computer bus 1002. Also interfacing with computer bus 1002 are computer-readable medium, or media, 1006, media disk interface 1008, network interface 1014, memory 1004, e.g., random access memory (RAM), run-time transient memory, read only memory (ROM), media disk drive interface 1020 as an interface for a drive that can read and/or write to media, display interface 1010 as interface for a monitor or other display device, keyboard interface 1016 as interface for a keyboard, pointing device interface 1018 as an interface for a mouse or other pointing device, and miscellaneous other interfaces 1022 not shown individually, such as parallel and serial port interfaces and a universal serial bus (USB) interface.

Memory 1004 interfaces with computer bus 1002 so as to provide information stored in memory 1004 to CPU 1012 during execution of software programs such as an operating system, application programs, device drivers, and software modules that comprise program code, and/or computer executable process steps, incorporating functionality described herein, e.g., one or more of process flows described herein. CPU 1012 first loads computer executable process steps from storage, e.g., memory 1004, computer readable storage medium/media 1006, removable media drive, and/or other storage device. CPU 1012 can then execute the stored process steps in order to execute the loaded computer-executable process steps. Stored data, e.g., data stored by a storage device, can be accessed by CPU 1012 during the execution of computer-executable process steps.

Persistent storage, e.g., medium/media 1006, can be used to store an operating system and one or more application programs. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 1034 typically provides information communication using transmission media through one or more networks to other devices that use or process the information. For example, network link 1034 may provide a connection through local network 1024 to a host computer 1026 or to equipment operated by a Network or Internet Service Provider (ISP) 1030. ISP equipment in turn provides data communication services through the public, worldwide packet-switching communication network of networks now commonly referred to as the Internet 1032.

A computer called a server host 1034 connected to the Internet 1032 hosts a process that provides a service in response to information received over the Internet 1032. For example, server host 1034 hosts a process that provides information representing video data for presentation at a display via display interface 1010. It is contemplated that the components of system 1000 can be deployed in various configurations within other computer systems, e.g., host and server.

At least some embodiments of the present disclosure are related to the use of computer system 1000 for implementing some or all of the techniques described herein. According to one embodiment, those techniques are performed by computer system 1000 in response to processing unit 1012 executing one or more sequences of one or more processor instructions contained in memory 1004. Such instructions, also called computer instructions, software and program code, may be read into memory 1004 from another computer-readable medium 1006 such as storage device or network link. Execution of the sequences of instructions contained in memory 1004 causes processing unit 1012 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 1000. Computer system 1000 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 1012 as it is received, or may be stored in memory 1004 or in a storage device or other non-volatile storage for later execution, or both.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media can tangibly encode computer-executable instructions that when executed by a processor associated with a computing device perform functionality disclosed herein in connection with one or more embodiments.

Computer-readable storage media includes, but is not limited to, RAM, ROM, EPROM, EEPROM, flash memory or other solid-state memory technology, CD-ROM, DVD, or other optical storage, cloud storage, magnetic cassettes, magnetic tape, magnetic disk storage or other magnetic storage devices, or any other physical or material medium which can be used to tangibly store thereon the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

The invention claimed is:

1. A method comprising:
   obtaining, at a computing device, user behavior data in connection with a user of an application;
   detecting, by the computing device, an action by another user related to an interaction with the application;
   generating, by the computing device, user behavior feature data based on the detected action by the other user using the obtained user behavior data;
   determining, by the computing device, via execution of multiple anomaly prediction models, a plurality of user behavior anomaly predictions, each user behavior anomaly prediction being a different type of anomaly prediction, each of the user behavior anomaly predictions indicating a probability that user behavior represented by the user behavior feature data is anomalous user behavior;
   aggregating, by the computing device, the different type of the plurality of user behavior anomaly predictions from the multiple anomaly prediction models, the aggregation comprising applying a weight value to a portion of the different type of the plurality of user behavior anomaly predictions;
   determining, by the computing device, an aggregate user anomaly behavior prediction based on the aggregating of the different type of the plurality of user behavior anomaly predictions;
   making, by the computing device, a user behavior anomaly determination using the aggregate user behavior anomaly prediction, the user behavior anomaly determination indicating whether or not the user behavior represented by the user behavior feature data is anomalous user behavior; and
   providing, by the computing device, functionality for the application to control the action based on the user behavior anomaly determination.

2. The method of claim 1, making a user behavior anomaly determination further comprising:
   determining, by the computing device, whether or not the user behavior anomaly prediction satisfies a threshold probability.

3. The method of claim 1, wherein the multiple anomaly prediction models comprise an Isolation Forest model, a variational auto-encoder model and a one-class support vector machine.

4. The method of claim 1, wherein the obtained user behavior data is selected from one or more of the following: keyboard usage data, Internet-Protocol (IP) related data, cursor activity data, bot usage data, script usage data, phone sensor data.

5. The method of claim 1, wherein the obtained user behavior data comprises user behavior data in connection with at least one previous session of the user with the application.

6. The method of claim 1, wherein obtaining user behavior data comprises generating additional user behavior data using at least a portion of the user behavior data.

7. The method of claim 6, wherein the additional user behavior data is selected from one or more of the following: funnel navigation pattern, pause length, session length, shortcut usage, script usage, fill form behavior, pointed mouse movement, API calls, local storage data check, aimless mouse movement, device gyroscope parameters, button press length, preference of interaction, information comprehension time, form edit count, and assistance used data.

8. The method of claim 1, generating user behavior feature data further comprising:
performing, by the computing device, data preprocessing on a user behavior feature data superset; and
selecting, by the computing device, the user behavior data from the user behavior feature data superset in accordance with the data preprocessing.

9. The method of claim 8, wherein the data preprocessing comprises a variance check, correlation analysis and data normalization.

10. The method of claim 8, wherein selecting the user behavior data from the user behavior feature data superset in accordance with the data preprocessing is done using principal component analysis (PCA).

11. The method of claim 1, further comprising:
determining, for each of the multiple anomaly prediction models, a probability score related to a user behavior based on the plurality of feature values;
combining each probability score respective to a threshold probability value that correlates to a determined number of true and false positives, wherein the aggregation of the determined types of anomaly predictions is further based on the combining of each probability score.

12. A non-transitory computer-readable storage medium tangibly encoded with computer-executable instructions that when executed by a processor associated with a computing device perform a method comprising:
obtaining user behavior data in connection with a user of an application;
detecting an action by another user related to an interaction with the application;
generating user behavior feature data based on the detected action by the other user using the obtained user behavior data;
determining, via execution of multiple anomaly prediction models, a plurality of user behavior anomaly predictions, each user behavior anomaly prediction being a different type of anomaly prediction, each of the user behavior anomaly predictions indicating a probability that user behavior represented by the user behavior feature data is anomalous user behavior;
aggregating the different type of the plurality of user behavior anomaly predictions from the multiple anomaly prediction models, the aggregation comprising applying a weight value to a portion of the different type of the plurality of user behavior anomaly predictions;
determining an aggregate user anomaly behavior prediction based on the aggregating of the different type of the plurality of user behavior anomaly predictions;
making a user behavior anomaly determination using the user behavior anomaly prediction, the aggregate user behavior anomaly determination indicating whether or not the user behavior represented by the user behavior feature data is anomalous user behavior; and
providing functionality for the application to control the action based on the user behavior anomaly determination.

13. The non-transitory computer-readable storage medium of claim 12, wherein the multiple anomaly prediction models comprise an Isolation Forest model, a variational auto-encoder model and a one-class support vector machine.

14. The non-transitory computer-readable storage medium of claim 12, generating user behavior feature data further comprising:
performing, by the computing device, data preprocessing on a user behavior feature data superset; and
selecting, by the computing device, the user behavior data from the user behavior feature data superset in accordance with the data preprocessing.

15. The non-transitory computer-readable storage medium of claim 14, wherein the data preprocessing comprises a variance check, correlation analysis and data normalization.

16. The non-transitory computer-readable storage medium of claim 14, wherein selecting the user behavior data from the user behavior feature data superset in accordance with the data preprocessing is done using principal component analysis (PCA).

17. A computing device comprising:
a processor, configured to:
obtain user behavior data in connection with a user of an application;
detect an action by another user related to an interaction with the application;
generate user behavior feature data based on the detected action by the other user using the obtained user behavior data;
determine, via execution of multiple anomaly prediction models, a plurality of user behavior anomaly predictions, each user behavior anomaly prediction being a different type of anomaly prediction, each of the user behavior anomaly prediction indicating a probability that user behavior represented by the user behavior feature data is anomalous user behavior;
aggregate the different type of the plurality of user behavior anomaly predictions from the multiple anomaly prediction models, the aggregation comprising applying a weight value to a portion of the different type of the plurality of user behavior anomaly predictions;
determine an aggregate user anomaly behavior prediction based on the aggregating of the different type of the plurality of user behavior anomaly predictions;
make a user behavior anomaly determination using the aggregate user behavior anomaly prediction, the user behavior anomaly determination indicating whether or not the user behavior represented by the user behavior feature data is anomalous user behavior; and
provide functionality for the application to control the action based on the user behavior anomaly determination.

18. The computing device of claim 17, wherein the multiple anomaly prediction models comprise an Isolation Forest model, a variational auto-encoder model and a one-class support vector machine.

19. The computing device of claim 17, generating user behavior feature data further comprising:
performing, by the computing device, data preprocessing on a user behavior feature data superset; and selecting, by the computing device, the user behavior data from the user behavior feature data superset in accordance with the data preprocessing.

20. The computing device of claim 19, wherein the data preprocessing comprises a variance check, correlation analysis and data normalization and wherein selecting the user behavior data from the user behavior feature data superset in accordance with the data preprocessing is done using principal component analysis (PCA).

\* \* \* \* \*